United States Patent [19]
Ito et al.

[11] Patent Number: 5,090,766
[45] Date of Patent: Feb. 25, 1992

[54] AERODYNAMICS CONTROL SYSTEM FOR AUTOMOTIVE VEHICLE

[75] Inventors: Hideo Ito; Hiroshi Tonomura; Moritsune Nakata; Yasuhiko Kobiki, all of Kanagawa, Japan

[73] Assignee: Nissan Motor Company, Ltd., Yokohama, Japan

[21] Appl. No.: 530,696

[22] Filed: May 30, 1990

[30] Foreign Application Priority Data

May 30, 1989 [JP] Japan .................................. 1-134587

[51] Int. Cl.$^5$ ............................................ B62D 37/02
[52] U.S. Cl. .................................. 296/180.5; 180/271
[58] Field of Search .......................... 296/180.1, 180.5; 180/288, 271

[56] References Cited

U.S. PATENT DOCUMENTS

| | | | |
|---|---|---|---|
| 2,976,077 | 3/1961 | Totton et al. | 296/180.5 |
| 3,326,318 | 6/1967 | DeBevoise | 296/180.5 |
| 3,512,825 | 5/1970 | Green | 296/180.5 |

FOREIGN PATENT DOCUMENTS

| | | | |
|---|---|---|---|
| 163772 | 8/1985 | Japan | 296/180.1 |
| 101078 | 6/1986 | Japan | 296/180.5 |

Primary Examiner—Robert R. Song
Attorney, Agent, or Firm—Pennie & Edmonds

[57] ABSTRACT

A control system for an aerodynamic equipment of an automotive vehicle, which is effective to prove higher cornering stability of the vehicle.

3 Claims, 10 Drawing Sheets

AERODYNAMICS CONTROL SYSTEM FOR AUTOMOTIVE VEHICLE

BACKGROUND OF THE INVENTION

1. Field of the Invention

The present invention relates generally to a control system for an aerodynamic equipment, such as a wing, for aerodynamically providing vehicular driving stability at various vehicle driving conditions. More specifically, the invention relates to a control system for an aerodynamic equipment, which assists to provide higher cornering stability of the vehicle.

2. Description of the Background Art

Japanese Utility Model First (unexamined) Publication No. 61-101078 discloses a wing control system for an automotive vehicle. The shown system has a vertical wing which is mounted on the vehicular body for pivotal movement about a vertical axis. The control system is responsive to a vehicle speed higher than a predetermined speed and a steering angle greater than a predetermined angle, to cause angular displacement of the vertical wing for utilizing aerodynamic force exerted on the wing for stabilizing the vehicle.

Such prior proposed system is effective for providing stability of the vehicle at a vehicle speed higher than the predetermined speed and at a steering angle greater than a predetermined angle. However, as can be naturally understood, the prior proposed system does not cover overall vehicular driving range.

For example, the aerodynamic force to be generated by the vertical wing is proportional to square of the vehicle speed. Therefore, when the wing angle is set for providing optimal steering characteristics at high vehicle speed, the aerodynamic force to be induced by the vertical wing tends to increase understeer characteristics.

Therefore, it is an object of the present invention to provide a control system for an aerodynamic equipment of an automotive vehicle, which is effective for stabilizing vehicle at any vehicular driving condition.

In order to accomplish aforementioned and other objects, an aerodynamic system for an automotive vehicle, according to the present invention, employs an aerodynamic wing which is pivotable about a vertical axis. A control system is associated with the aerodynamic wing for controlling angular position thereof. The control system is responsive to a vehicle speed and a steering angle for deriving an angular position of the aerodynamic wing as a function of the vehicular speed and the steering angle in such a manner than the angular displacement of the aerodynamic wing from the neutral position is reduced according to increasing of the vehicular speed.

According to one aspect of the invention, an aerodynamics control system for an automotive vehicle comprises:

an aerodynamic wing mounted on a vehicle body, having a vertically extending wing surface and pivotable about a vertical axis within a predetermined angular range across a neutral position;

a drive means for driving the aerodynamic wing for causing angular displacement about the vertical axis;

a vehicle speed sensor for monitoring vehicle speed to produce a vehicle speed indicative signal;

a steering angle sensor for monitoring steering angular position to produce a steering angle indicative signal;

a control unit receiving the vehicle speed indicative signal and the steering angle indicative signal to derive a control signal for controlling driving magnitude of the drive means to place the aerodynamic wing at a desired angular position which is determined on the basis of the vehicular speed indicative signal and the steering angle indicative signal, the control unit deriving a rate of angular displacement of the aerodynamic wing relative to the steering angle indicative signal depending upon the vehicle speed indicative signal so that the rate is decreased according to increasing of the vehicle speed.

The control unit may derive the angular displacement from the neutral position on the basis of the vehicle speed and a steering angular displacement. In the alternative, the control unit derives the angular displacement of the aerodynamic wing from the neutral position with a predetermined primary lag factor. In the later case, it may be preferable that the primary large factor is variable depending upon the vehicle speed.

BRIEF DESCRIPTION OF THE DRAWINGS

The present invention will be understood more fully from the detailed description given herebelow and from the accompanying drawings of the preferred embodiment of the invention. However, it is to be noted that the present invention is not to be limited only to the specific embodiment shown. The present embodiment has been illustrated for purposes of explanation and understanding only.

In the drawings.

DESCRIPTION OF THE PREFERRED EMBODIMENT

Figure 1:
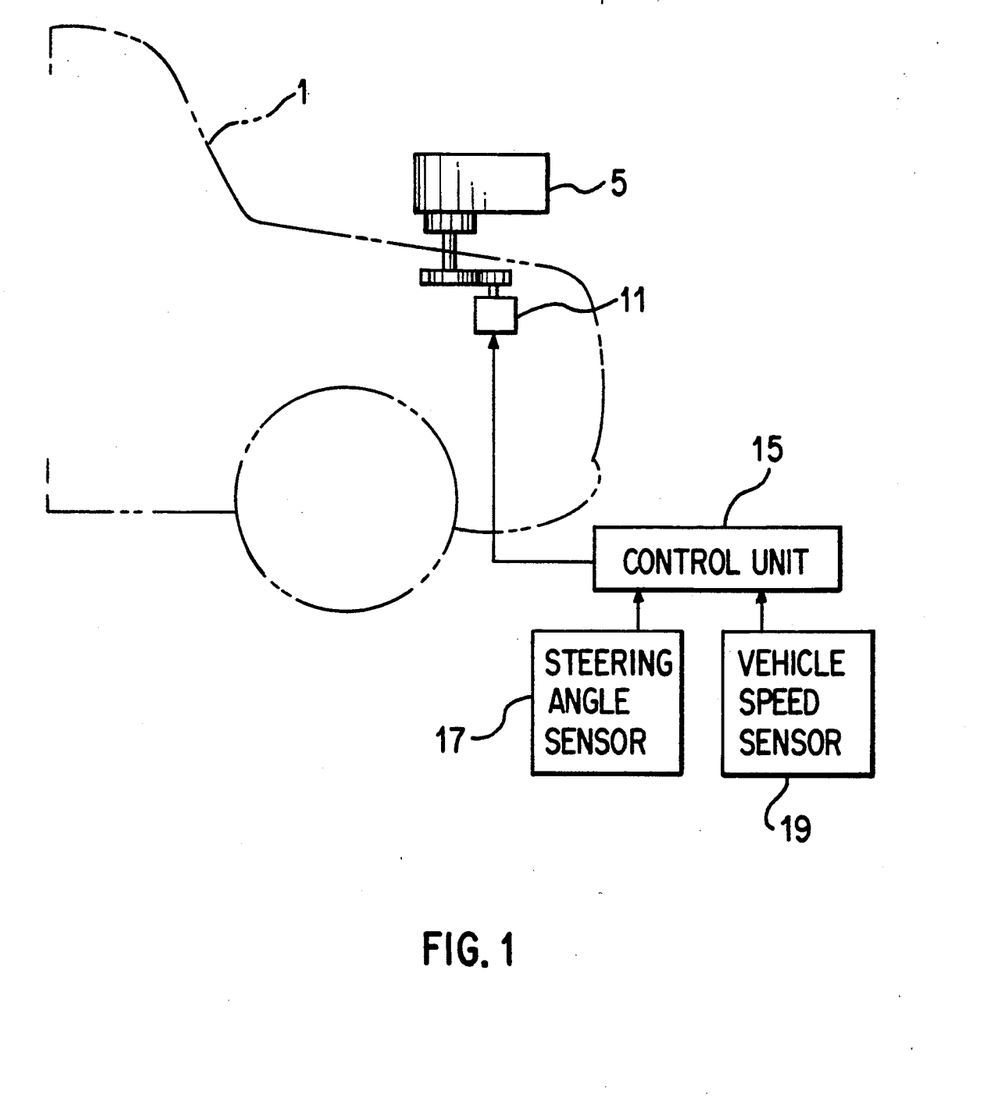
FIG. 1 is a schematic block diagram of the preferred embodiment of an aerodynamics control system for an automotive vehicle, according to the present invention.
Figure 2:
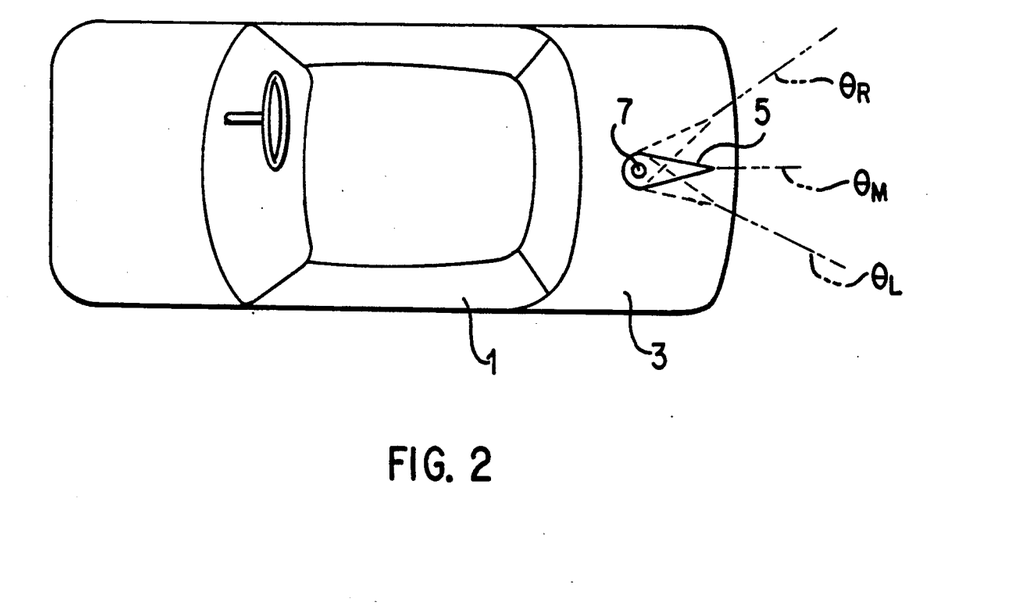
FIG. 2 is a plan view of an automotive vehicle for which the preferred embodiment of the aerodynamics control system according to the invention is applied.
Figure 3:
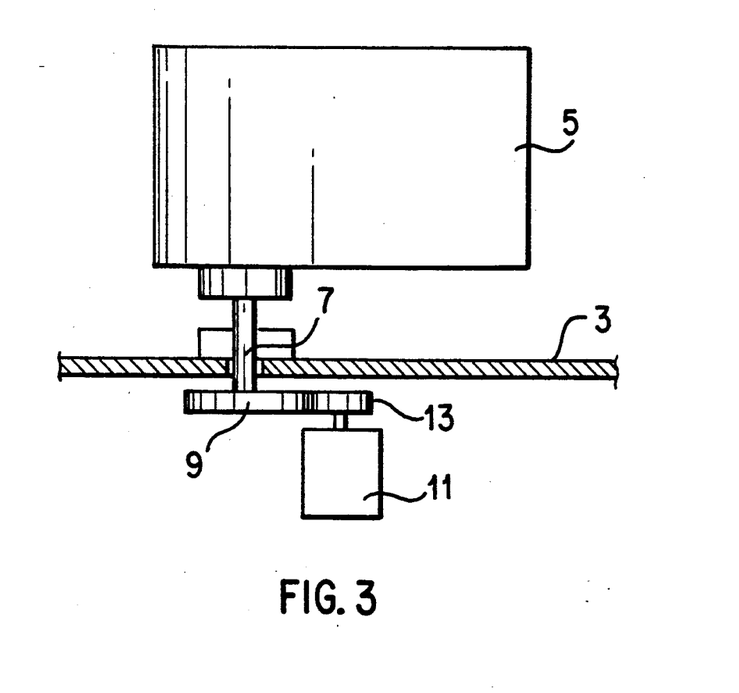
FIG. 3 is a side elevation of an aerodynamic wing associated with a drive mechanism, which forms the major part of the preferred embodiment of the aerodynamics control system according to the invention.

Referring now to the drawings, particularly to FIG. 1, the preferred embodiment of an aerodynamics control system, according to the present invention, employs a vertical aerodynamic wing 5 mounted on a trunk lid 3 of a vehicle body 1. The vertical aerodynamic wing 5 is pivotable horizontally about a vertical axis. As shown in FIGS. 1 and 3, the vertical aerodynamic wing 5 is supported on a rotary shaft 7 for rotation therewith. The rotary shaft 7 extends through the trunk lid 3 to extend into the interior space of a trunk room or luggage compartment. A driven gear 9 is firmly or fixedly mounted on the lower end of the rotary shaft 7. The driven gear 9 and associated lower end of the rotary shaft 7 are thus oriented within the trunk room. The driven gear 9 meshes with a drive gear 13 which is fixedly mounted on a drive shaft of a stepping motor 11. The stepping motor 11 is a reversible motor for generating driving torques in both rotational direction. The driving torque of the stepping motor 11 is thus transmitted through a gear train constituted by the gears 9 and 13.

As can be seen from FIG. 3, the driven gear 9 has greater diameter than that of the drive gear 13. This establishes a gear ratio in the gear train to provide greater driving torque to be exerted on the rotary shaft 7 with the driven gear 9. The stepping motor 11 and the gear train of the gears 9 and 11 form a drive mechanism for driving the vertical aerodynamic wing 5 in horizontal direction about the vertical axis between a predetermined angular range between $\theta_L$ and $\theta_R$ across a neutral position $\theta_M$, at which the vertical aerodynamic wing is oriented in alignment with the longitudinal axis of the vehicle and thus generates minimum aerodynamic force.

Figure 4:
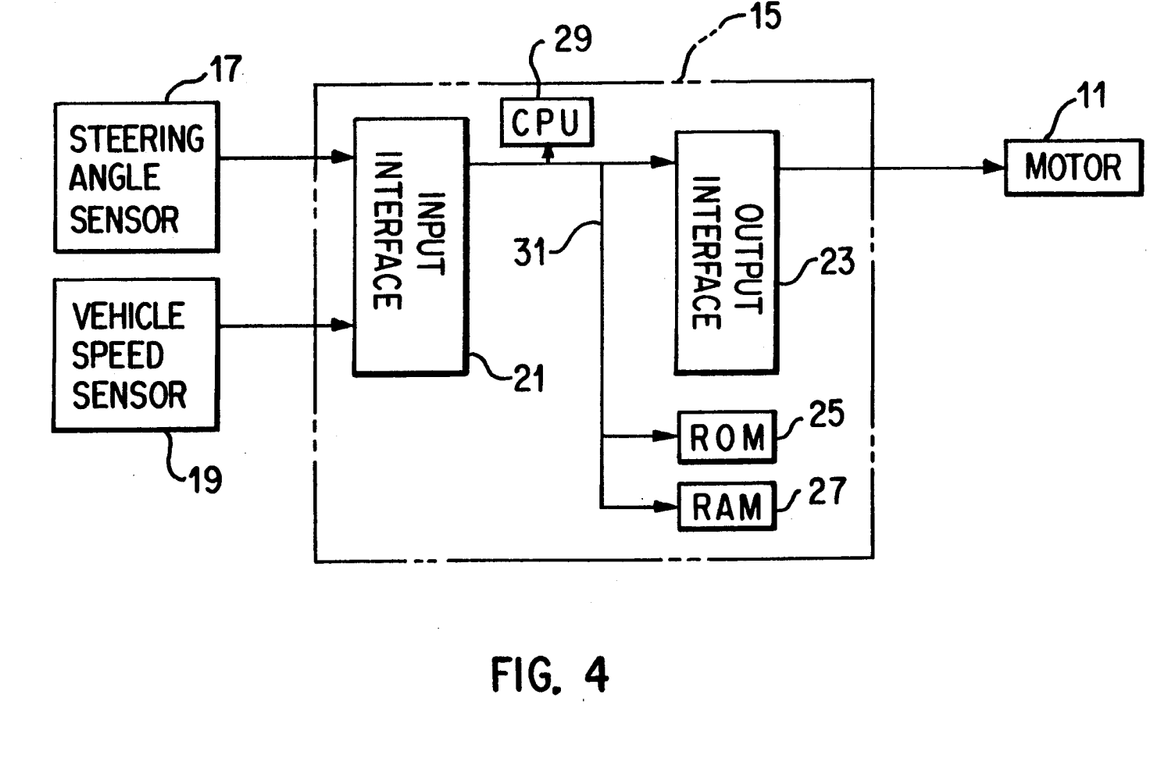
FIG. 4 is a block diagram of a control circuit in the preferred embodiment of the aerodynamics control system of FIG. 1.

As shown in FIG. 4, the stepping motor 11 is connected to a control unit 15 which comprises a microprocessor including an input interface 21. An output interface 23, ROM 25, RAM 27, CPU 29 respectively connected via bus line 31. The input interface 21 is connected to a vehicle speed sensor 19 and a steering angle sensor 17 for receiving therefrom a vehicle speed indicative date and a steering angle indicative data. CPU 29 processes the input vehicle speed indicative data and the steering angle indicative data for deriving an angular position of the vertical aerodynamic wing 5. CPU 29 thus derives a control signal representative of the derived angular position of the vertical aerodynamic wing.

Figure 5:
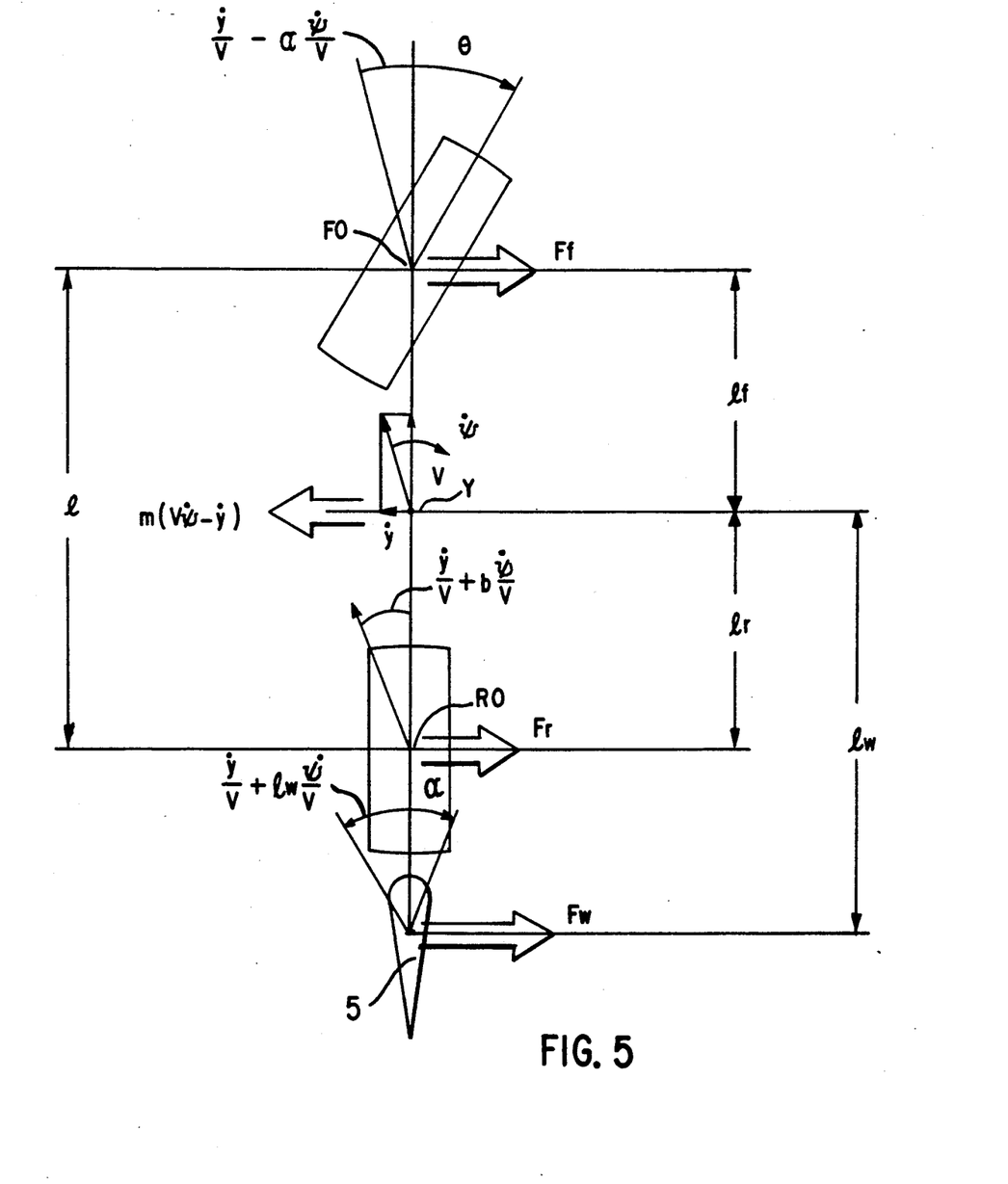
FIG. 5 is an explanatory illustration showing effect of the preferred embodiment of the aerodynamics control system as applied for a two wheel model.

The operation of the preferred embodiment of the aerodynamics control system according to the invention will be discussed by utilizing two wheel model shown in FIG. 5. In the following discussion, parameters used in the discussion are as follows:

l: wheel base;
$l_f$: distance between a gravity center Y and a front wheel axle OF;
$l_r$: distance between the gravity center Y and a rear wheel axle RO;
$l_w$: axial distance between the gravity center Y and the vertical aerodynamic wing;
m: vehicular mass weight;
I: inertia moment of the vehicle;
$\dot{\psi}$: yawing rate obtained by differentiating a yaw angle $\psi$;
V: vehicular speed;
y: lateral speed at the gravity center;
p: air density;
C: lateral force coefficient at unit radian of the wing;
$S_w$: surface area of the wing;
$\theta$: steering angle at the front wheel; and
$\alpha$: angular displacement from the neutral position.

Taking the foregoing parameter, the equation of motion can be expressed as:

$$m(V\dot{\phi} - \ddot{y}) = F_f + F_r + F_w$$
$$I \cdot \ddot{\phi} = l_f \cdot F_f - l_r \cdot F_r - l_w \cdot F_w$$

$$F_f = C_{pf}\left(\theta + \left(\frac{\dot{y}}{V}\right) - l_f \cdot \left(\frac{\dot{\psi}}{V}\right)\right)$$

$$F_r = C_{pr}\left(\frac{\dot{y}}{V}\right) + l_r \cdot \left(\frac{\dot{\psi}}{V}\right)$$

$$F_w = \tfrac{1}{2}\rho \cdot v^2 \cdot C_s \cdot S \left((\dot{y}/v) + l_w \cdot (\dot{\psi}/v) + \alpha\right)$$
$$= C_w \cdot V^2 \left((\dot{y}/V) + l_w \cdot (\dot{\psi}/V) + \alpha\right)$$

The foregoing equation can be transformed by RaPlace transformation as follows:

$$\left(m \cdot V + \frac{C_{pf} \cdot l_f - C_{pr} \cdot l_r - C_w \cdot l_w}{V}\right)\dot{\psi}(S) -$$

$$\left(m \cdot S^2 + \frac{C_{pf} + C_{pr} + C_w}{v} S\right)y(S) - C_{pf} \cdot \theta(S) + C_w \cdot \alpha(S)$$

$$\left(I \cdot S + \frac{C_{pf} \cdot l_f^2 + C_{pr} \cdot l_r^2 + C_w \cdot l_w^2}{V}\right)\dot{\psi}(S) -$$

$$\left(\frac{C_{pf} \cdot l_f - C_{pr} \cdot l_r - C_w \cdot l_w}{V} S\right)\dot{y}(s) =$$

$$C_{pf} l_f \cdot \theta(S) - C_w \cdot l_w \cdot \alpha(S)$$

From the foregoings, the denominator of the solution can be expressed by:

$$-\left(m \cdot V + \frac{C_{pf} \cdot l_f - C_{pr} \cdot l_r - C_w \cdot V^2 \cdot l_w}{V}\right) \cdot$$

$$\left(\frac{C_{pf} \cdot l_f - C_{pr} \cdot l_r - C_w \cdot l_w}{V} S\right) +$$

$$\left(I \cdot S + \frac{C_{pf} \cdot l_f^2 + C_{pr} \cdot l_r^2 + C_w \cdot V^2 \cdot l_w^2}{V}\right) \cdot$$

$$\left(m \cdot S^2 + \frac{C_{pf} + C_{pr} + C_w \cdot V^2}{V} S\right) =$$

$$S\left(m \cdot I \cdot S^2 + \left[\frac{m}{V} \cdot (C_{pf} \cdot l_f^2 + C_{pr} \cdot l_r^2 + C_w \cdot V^2 \cdot l_w^2) + \frac{I}{V}(C_{pf} + C_{pr} + C_w \cdot V^2)\right]S - \right.$$

$$m(C_{pf} \cdot l_f - C_{pr} \cdot l_r - C_w \cdot V^2 \cdot l_w) +$$

-continued $$\frac{1}{V^2}[C_{pf} \cdot C_{pr}(l_f + l_r)^2 +$$

$$C_{pf}C_w \cdot V^2 \cdot (l_f + l_w)^2 + C_w \cdot V^2 \cdot C_{pr} \cdot (l_r + l_w)^2]$$

On the other hand, the numerator of the solution can be expressed by:

$$-(C_{pf} \cdot \theta(s) + C_w \cdot V^2 \cdot \alpha(s)) \cdot$$

$$\frac{C_{pf} \cdot l_f - C_{pr} \cdot l_r - C_w \cdot V^2 \cdot l_w}{V} S +$$

$$(C_{pf} \cdot l_f \cdot \theta(s) - C_w \cdot V^2 \cdot l_w \cdot \alpha(s)) \cdot$$

$$\left(m \cdot S^2 + \frac{C_{pf} + C_{pr} + C_w \cdot V^2}{V} S\right) =$$

$$\left[m \cdot C_{pf} \cdot l_f \cdot S^2 + \frac{1}{V} \cdot (C_{pf} \cdot C_{pr} \cdot l + C_{pf} \cdot C_w \cdot V^2 \cdot l_w) \cdot S\right].$$

$$\theta(s) -$$

$$\left[m \cdot C_w \cdot V^2 \cdot l_w \cdot S^2 + \frac{1}{V} \cdot C_{pf} \cdot C_w \cdot V^2 \cdot (l_f + l_w)S\right]\alpha(s)$$

From the foregoing, the following equation can be derived:

$$\psi(s) = \frac{K_\theta \cdot Wn^2(1 + \tau_\theta \cdot S)\theta(s) - K_\alpha \cdot Wn^2(1 + \tau_\theta \cdot S) \cdot \alpha(s)}{S + 2\xi n \cdot Wn \cdot S + Wn^2}$$

$$2\xi n \cdot Wn = \frac{1}{I \cdot V}(C_{pf} \cdot l_f^2 + C_{pr} \cdot l_r^2 + C_w \cdot V^2 \cdot l_w^2) +$$

$$\frac{1}{m \cdot V} C_{pf} + C_{pr} + C_w \cdot V^2)$$

$$Wn^2 = -\frac{1}{I}(C_{pf} \cdot l_f - C_{pr} \cdot l_r - C_w \cdot V^2 \cdot l_w) +$$

$$\frac{1}{m \cdot I \cdot V^2}[C_{pf} \cdot C_{pr}(l_f + l_r)^2 +$$

$$C_{pf} \cdot C_w \cdot V^2(l_f + l_w)^2 + C_w \cdot V^2 \cdot C_{pr}(l_r + l_w)^2$$

From the above, the numerator can be modified as:

$$K_\theta \cdot Wn^2 = m \cdot C_{pf} \cdot l_f$$

$$K_\theta \cdot Wn^2 \cdot \tau_\theta = \frac{1}{V}(C_{pf} \cdot C_{pr} \cdot l + C_{pf} \cdot C_w \cdot V^2 \cdot l_w)$$

$$K_\alpha \cdot Wn^2 = m \cdot C_w \cdot V^2 \cdot l_w$$

$$K_\alpha \cdot Wn^2 \cdot \tau_\alpha = \frac{1}{V} \cdot C_{pf} \cdot C_w \cdot V^2(l_f + l_w)$$

From the above, the absolute value of the static value of the yaw rate $\psi(s)$ can be expressed by:

$$\dot{\psi}(0) = K_\theta \cdot \theta - K_\alpha \cdot \alpha = \frac{m}{Wn^2}(C_{pf} \cdot l_f \cdot \theta - C_w \cdot V^2 \cdot l_w \cdot \alpha)$$

Figure 6:
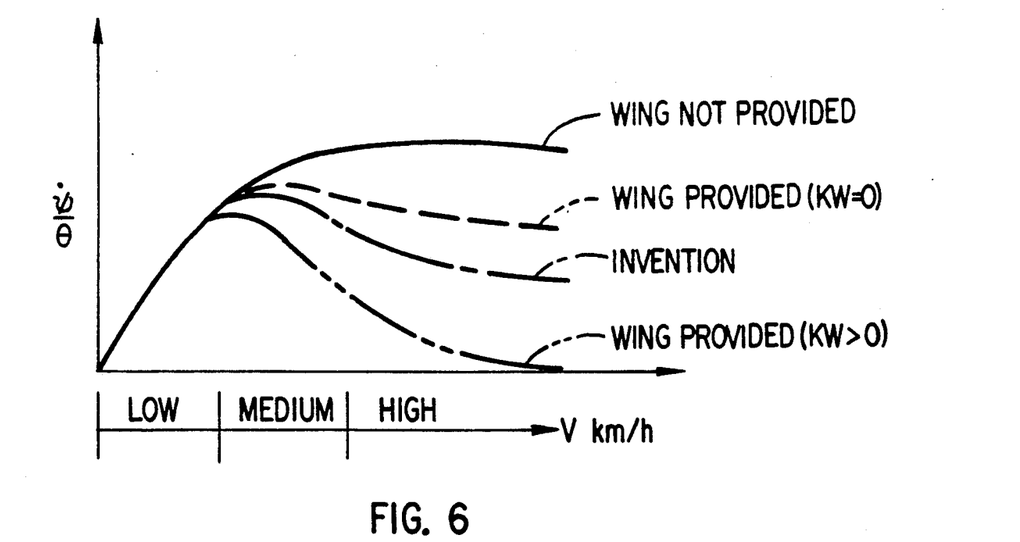
FIG. 6 is a chart showing a relationship between a vehicular speed and yawing rate.

Assuming $\alpha = kw \cdot \theta$ (kw is constant): that is when the vertical aerodynamic wing 5 is pivotally moved in proportion to the steering angle $\theta$ at front wheels, the vertical aerodynamic wing 5 is pivoted in the equal direction to the steering direction of the front wheels if kw is set greater than zero (O). When the vertical aerodynamic wing 5 is pivoted synchronously with the steering of the front wheels in the same direction, the aerodynamic force generated by the wing will serve to stabilize the vehicle. The effect of wing may be demonstrated in the results of simulation as shown in FIG. 6. As can be seen from FIG. 6, the results of simulation shows that by synchronously pivoting the vertical aerodynamic wing 5 by setting the constant kw greater than zero, a yawing rate $\psi$ be reduced significantly.

However, since the aerodynamic force to be generated by the vertical aerodynamic wing 5 is proportional to square of the vehicle speed ($V^2$). Therefore, at relatively high speed as labeled in high speed range, vehicular stability becomes effective to excessively reduce the yawing rate. This results in an excessive understeering to cause difficulty of cornering. In this sense, the aerodynamic force at the medium speed range would be preferred even at the high speed range.

Figure 7:
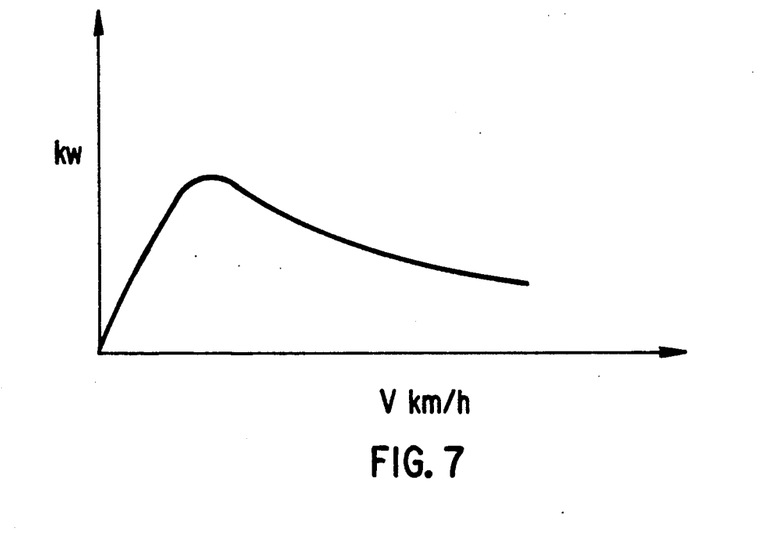
FIG. 7 is a chart showing a relationship between a vehicular speed and a proportional constant.

In view of this, the preferred embodiment of the aerodynamics control system, according to the present invention, employs variable kw value which is variable depending upon the vehicle speed as shown in FIG. 7. As can be seen, the kw value is varied to reduce the value according to the increase of the vehicle speed in the vehicle speed range from the medium speed range to he high speed range. Decreasing of the kw value results in reducing of a rate of change in the angular displacement $\alpha$ of the vertical aerodynamic wing 5. In this manner, the yaw rate gain at the high vehicle speed range can be appropriately controlled for providing better drivability of the vehicle.

Figure 8:
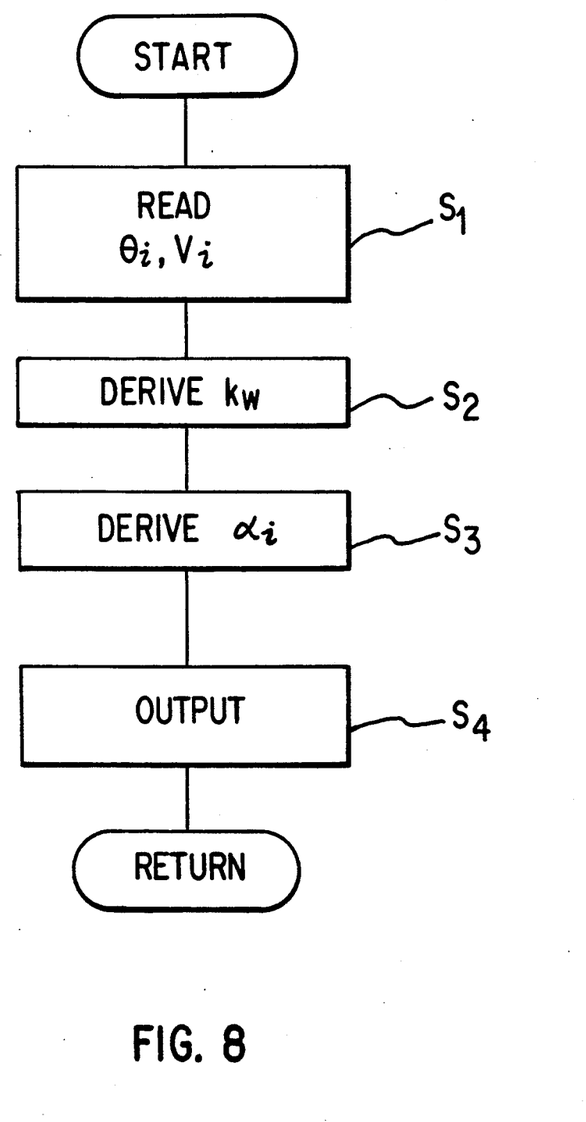
FIG. 8 is a flowchart showing operation of the aerodynamics control system of FIG. 4.

FIG. 8 is a flowchart shows the operation for controlling angular position of the vertical aerodynamic wing 5. The shown process maybe executed periodically.

Immediately after starting execution, the steering angle data $\theta_i$ from the steering angle sensor 17 and the vehicle speed data $v_i$ from the vehicle speed sensor 19 are read out at a step S1. Based on the vehicle speed data $v_i$, the $kw_i$ is derived according to the characteristics of FIG. 7, at a step S2. Then, by multiplying the steering angle data $\theta_i$ with the $kw_i$ value, the angular displacement $\alpha_i$ of the vertical aerodynamic wing 5 is derived at a step S3. Then, the control signal representative of the derived angular displacement $\alpha_i$ is output to the stepping motor 11 for causing corresponding magnitude of angular displacement in the vertical aerodynamic wing 5.

In the practical control, since the magnitude of angular displacement is appropriately adjusted on the basis of the steering angle and the vehicle speed so as to generate optimal aerodynamic force with the vertical aerodynamic wing 5, vehicular driving stability with appropriate cornering characteristics can be obtained. particularly, since the shown embodiment reduces the rate of change in angular displacement of the vertical aerodynamic wing according to the increase of the vehicle speed in the high vehicle speed range, the aerodynamic force to be generated cannot become excessive.

Figure 9A:
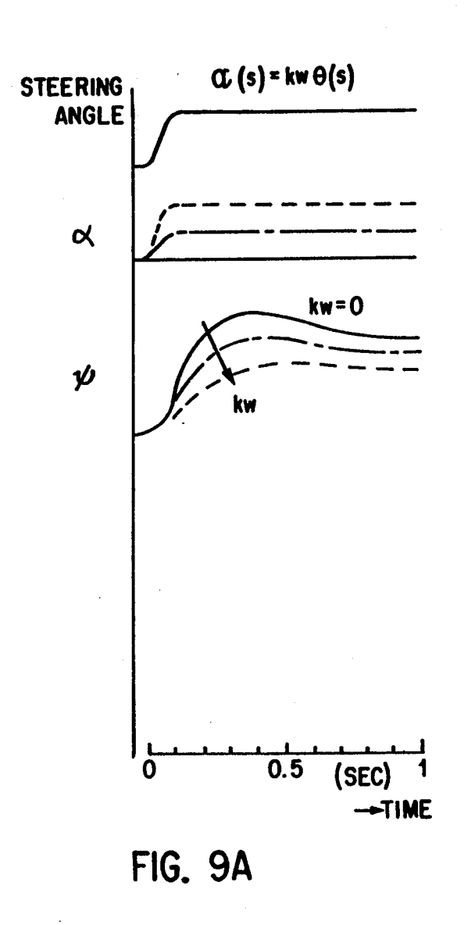
FIGS. 9(a), 9(b) and 9(c) illustrate variation of steering angle, aerodynamic wing angular position and yawing rate.

With the shown construction, the preferred embodiment of the aerodynamic control system, according to the present invention can provide vehicular driving stability without causing degradation of the cornering characteristics over all of the vehicle driving range, as shown in FIG. 9(a).

Figure 10:
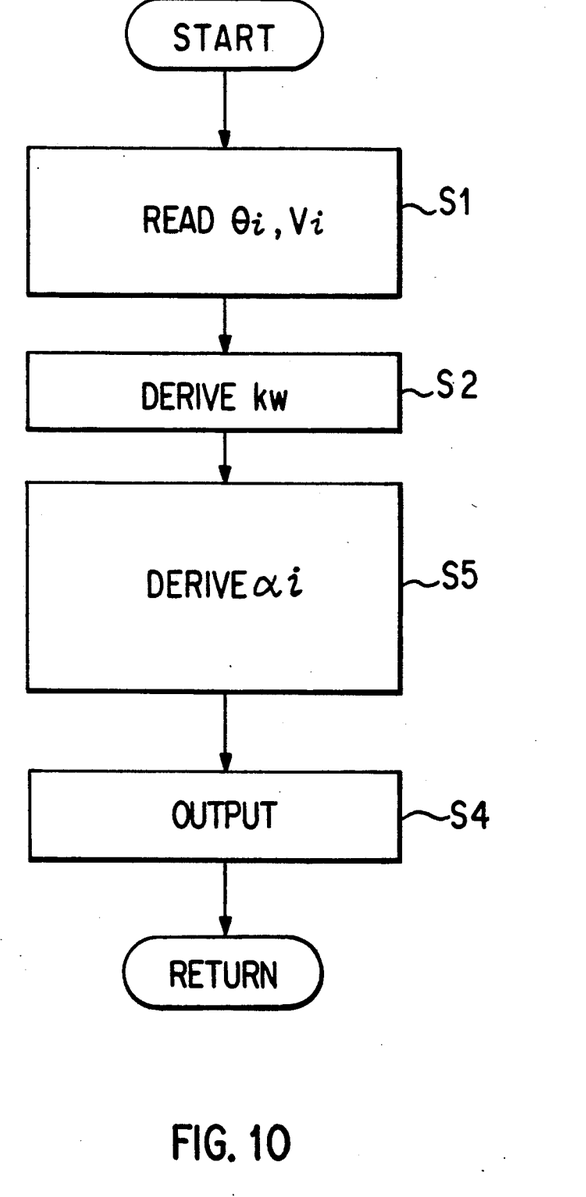
FIG. 10 is a flowchart showing another preferred process to be performed by the preferred embodiment of the aerodynamics control system of FIG. 4.

FIG. 10 shows another preferred process of aerodynamics control to be performed by the preferred embodiment of the aerodynamics control system, according to the invention.

In the shown process, a step S5 is performed in place of the step S3 in the foregoing process. At the step S5, the angular displacement $\alpha$ is derived according to the following equation:

$$\alpha(s) = kw(V) \cdot (1 - \tau_f s)\theta(s)$$

Figure 9B:
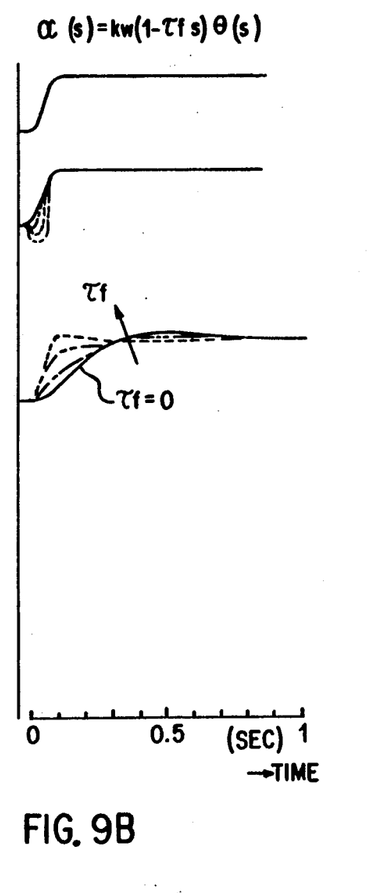

With the foregoing equation, the angular displacement $\alpha$ of the vertical aerodynamic wing 5 is derived on the basis of the kw value which is variable depending upon the vehicle speed and the steering angular displacement, as shown in FIG. 9(b).

Figure 11:
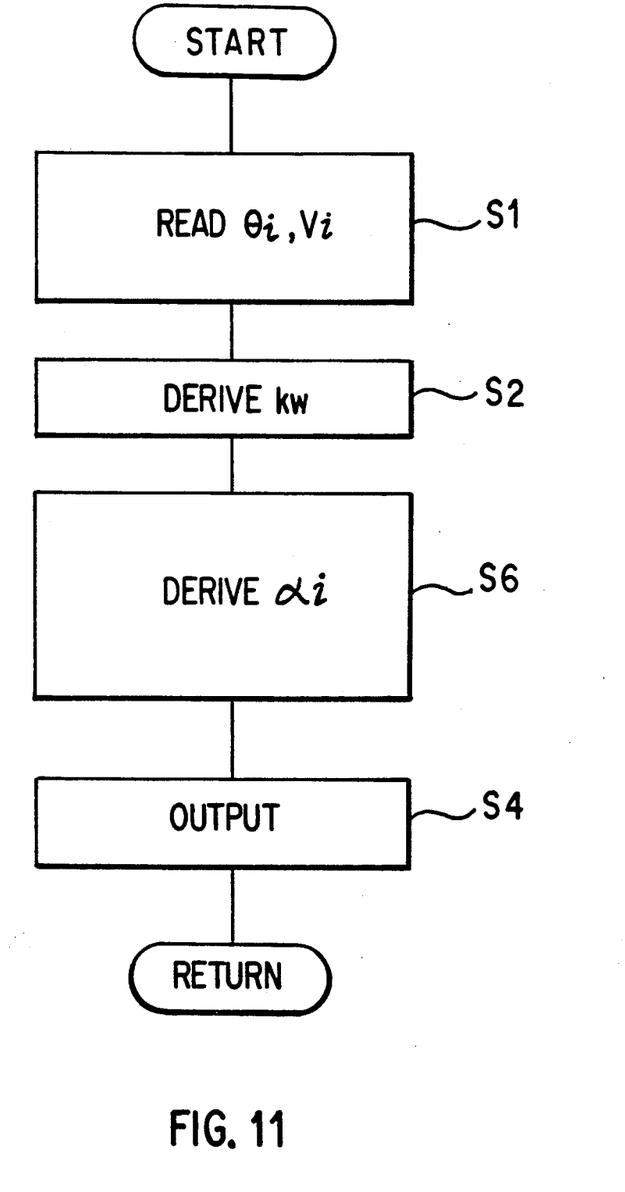
FIG. 11 is a flowchart of a further process to be performed by the aerodynamics control system of FIG. 4.

FIG. 11 also shows modification of the preferred process in FIG. 8. In the shown process, the step S3 in FIG. 8 is replaced with a step S6. At the step S6, the angular displacement $\alpha$ is derived according to the following equation:

$$\alpha(S) = kw(V) \frac{1}{(1 + \tau_d \cdot S)} \theta(S)$$

Figure 9C:
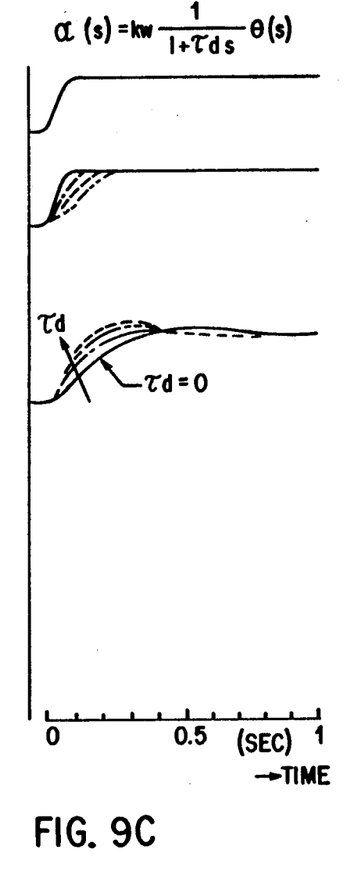

With the angular displacement $\alpha$ derived through the step S6, the characteristics as shown in FIG. 9(c) can be obtained.

Figure 12:
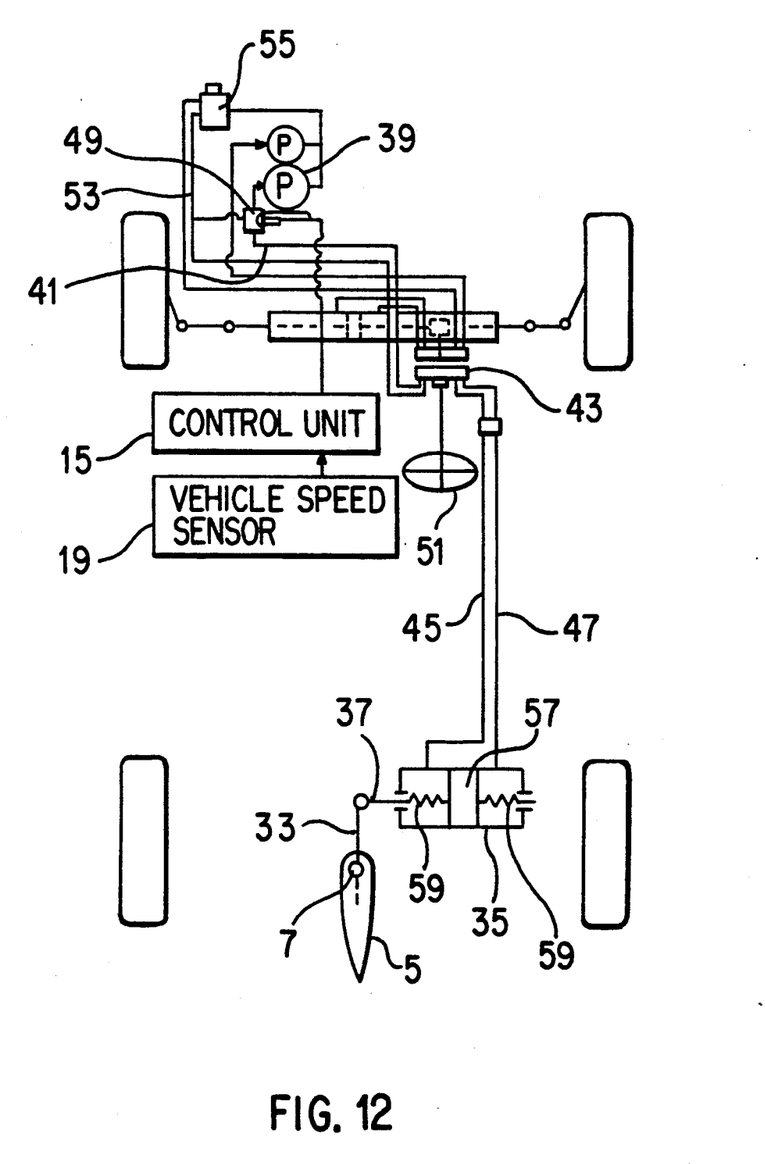
FIG. 12 is a fragmentary illustration of the aerodynamics control system which implements the process of FIG. 11.

In order to implement the process of FIG. 10, a system as shown in FIG. 12 is employed. The shown construction employs a hydraulic system for driving the vertical aerodynamic wing 5 for causing angular displacement.

The rotary shaft 7 of the vertical aerodynamic wing 5 is connected to a piston rod 37 via a linkage 33. The piston rod 37 carries a piston 57 disposed within a hydraulic cylinder 35. Two fluid chambers defined within the hydraulic cylinder 35 is connected to a hydraulic pump 39. The hydraulic pump 39 is connected to a flow control valve 43 via a supply line 41. The flow control valve 43 is connected to respective of two fluid chambers within the hydraulic cylinder 35 via branch lines 45 and 47. A flow restriction valve 49 is disposed within the supply line 41. The flow restriction valve 49 is connected to the control unit 15 for controlling the flow restriction magnitude, and thereby controlling the line pressure to be supplied to the fluid chambers.

The flow control valve 43 is responsive to the steering operation to switch connection between the hydraulic pump 39 and the fluid chambers via the branch lines 45 and 47, according to the steering direction. The flow control valve 43 is further operable to the neutral position where fluid communication between the supply line 41 and the branch lines 45 and 47 is blocked. Return springs 59 having equal spring forces are respectively disposed within the fluid chambers in the hydraulic cylinder so that the piston 57 can be placed at the neutral position which corresponds to the neutral position of the vertical aerodynamic wing.

In the shown construction, the flow control valve 43 is operated to establish fluid communication between the supply line 41 and one of the branch lines 45 and 47 in response to the steering operation. Then, the pressurized fluid discharged from the hydraulic pump 39 is supplied to one of the fluid chambers to destroy the force balance to cause shifting of the piston from the neutral position. As a result, the vertical aerodynamic wing 5 is driven to cause angular displacement in the corresponding direction. On the other hand, at the same time, the control unit 15 derives the magnitude of angular displacement $\alpha$ of the vertical aerodynamic wing on the basis of the vehicle speed and the steering angular position. The control unit 15 controls the flow restriction valve 49 for adjusting the flow restriction magnitude.

With the construction shown in FIG. 11, since the wing drive mechanism is formed with a hydraulic system, the control characteristics of the vertical aerodynamic wing may have a first-order lag factor. That is, the previously described equation of the angular displacement $\alpha(S)$ of the vertical aerodynamic wing includes a particular term with regard to a coefficient $\tau_d$ of the first-order lag. Furthermore, as appreciated from the previously described equation of the angular displacement $\alpha(S)$ derived in step 5 of FIG. 10, the equation includes a particular term with regard to a coefficient $\tau_f$ of the first-order lag. Therefore, in the two embodiments shown in FIGS. 10 and 11, since the angular displacement $\alpha(S)$ is determined with the first-order lag factor depending on a rate of change in the steering angle $\theta$, the aerodynamics control system provides a high steering characteristic and a superior vehicular body attitude control.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set forth herein.

What is claimed is:

1. An aerodynamics control system for an automotive vehicle comprising:

a vertically positioned aerodynamic wing mounted on a body of said vehicle, having a vertically extending wing surface, and pivotable about a vertical axis within a predetermined angular range across a neutral position;

drive means for driving said aerodynamic wing for causing angular displacement about said vertical axis;

a vehicle speed sensor for monitoring vehicle speed to produce a vehicle speed indicative signal;

a steering angle sensor for monitoring steering angular position to produce a steering angle indicative signal;

a control unit for receiving said speed indicative signal and said steering angle indicative signal to derive a control signal for controlling a driving magnitude of said drive means to rotate said aerodynamic wing about said vertical axis at a desired angular position which is determined on the basis of said vehicle speed indicative signal and said steering angle indicative signal, said control unit deriving a rate of change in angular displacement of said aerodynamic wing relative to said steering angle, depending upon said vehicle speed indicative signal such that said rate of change in angular displacement is decreases according to the increase of the vehicle speed in a particular vehicle speed range from a medium speed to a high speed, so as to provide an optimum yawing rate of the vehicle.

2. An aerodynamics control system as set forth in claim 1, wherein said control unit derives said angular displacement of said aerodynamic wing from said neutral position with a predetermined first-order lag factor being variable depending on the rate of change of the steering angular position.

3. An aerodynamics control system for an automotive vehicle comprising:
- a vertically placed aerodynamic wing mounted on a body of the vehicle, having a vertically extending wing surface, and pivotable about a vertical axis within a predetermined angular range across a neutral position;
- drive means for driving said aerodynamic wing for causing angular displacement about said vertical axis;
- a vehicle speed sensor for monitoring vehicle speed to produce a vehicle speed indicative signal;
- a steering angle sensor for monitoring steering angular position to produce a steering angle indicative signal;
- a control unit receiving said vehicle speed indicative signal and said steering angle indicative signal to derive a control signal for controlling a driving magnitude of said drive means to rotate said aerodynamic wing about said vertical axis at a desired angular position which is determined on the basis of said vehicle speed indicative signal and said steering angle indicative signal, said control unit deriving a rate of change in angular displacement of said aerodynamic wing relative to said steering angle, depending upon said vehicle speed such that said rate of change in angular displacement is increased according to the increase of the vehicle speed in a first vehicle speed range from a low speed to a medium speed and is decreased according to increasing of the vehicle speed in a second vehicle speed range from the medium speed to a high speed, so as to provide an optimum yawing rate of the vehicle.

* * * * *